Nov. 15, 1955  C. G. LONGFORD  2,723,675
DEVICE FOR CONTROLLING THE FUEL FLOW FROM
THE FUEL TANKS OF AN AIRCRAFT
Filed Nov. 20, 1951  2 Sheets-Sheet 1
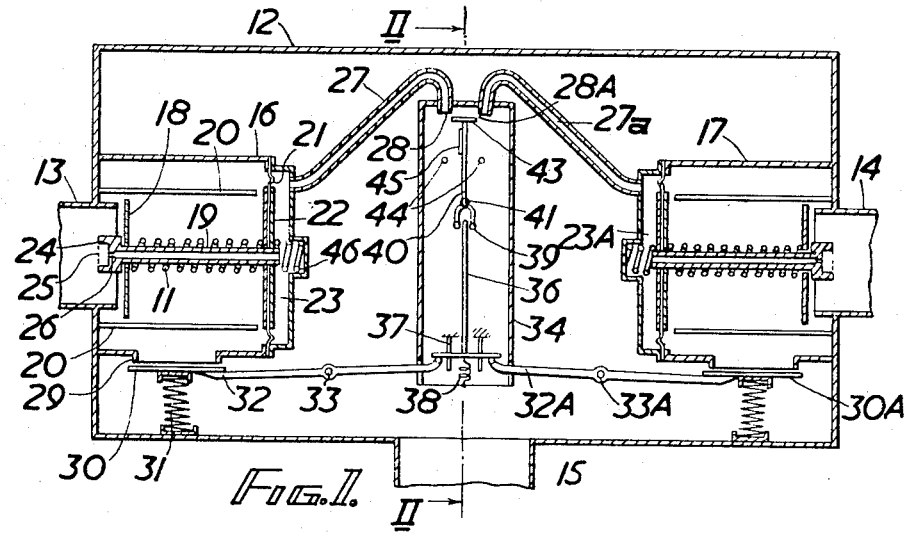
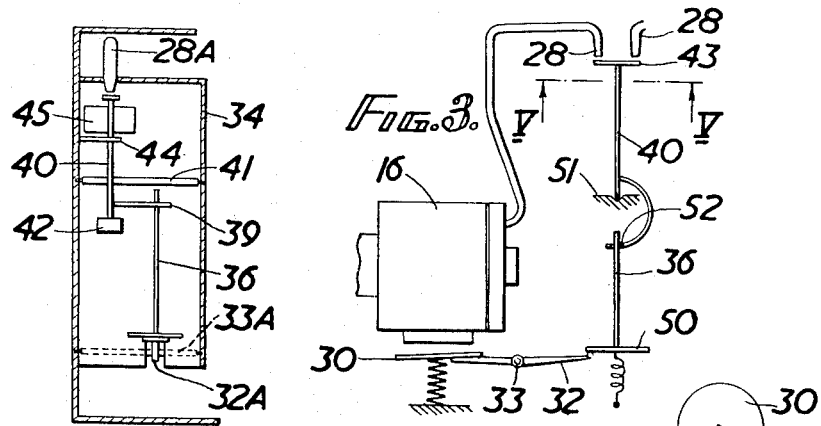
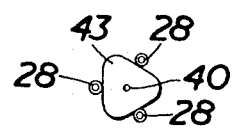
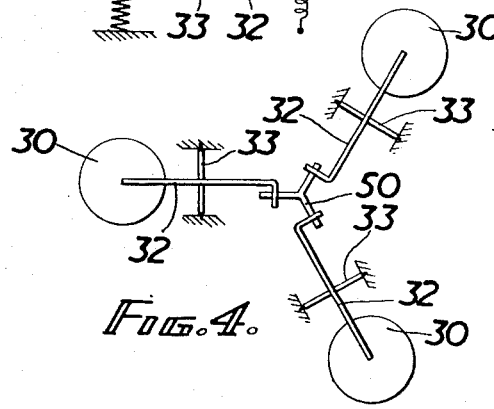
Inventor
CHARLES GEOFFREY LONGFORD
By
Attorney Nov. 15, 1955 C. G. LONGFORD 2,723,675
DEVICE FOR CONTROLLING THE FUEL FLOW FROM
THE FUEL TANKS OF AN AIRCRAFT
Filed Nov. 20, 1951 2 Sheets-Sheet 2
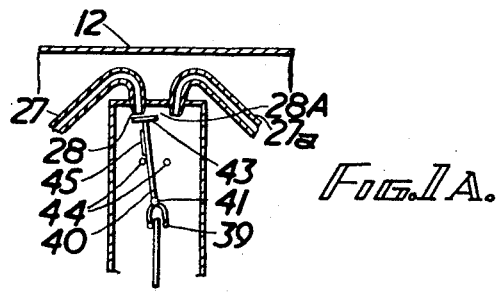
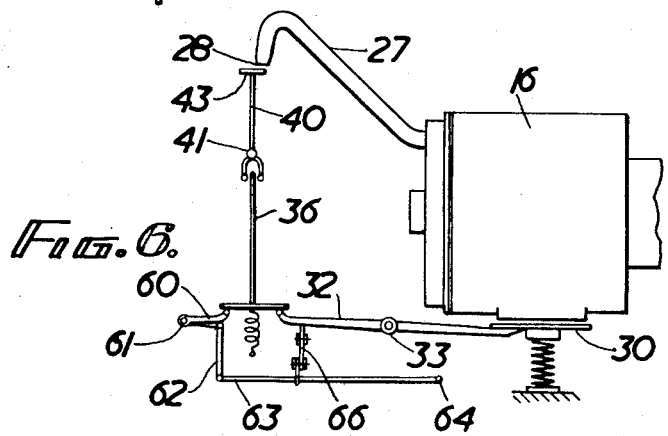
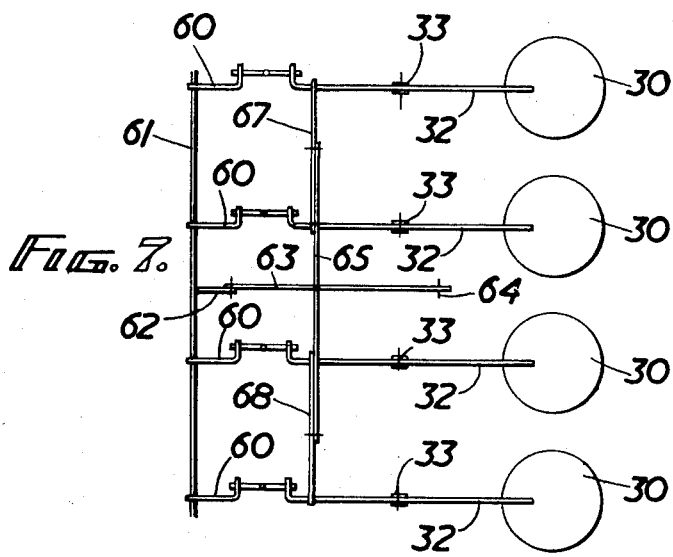
Inventor
CHARLES GEOFFREY LONGFORD
By *Frederick E. Hay*
Attorney United States Patent Office 2,723,675
Patented Nov. 15, 1955

2,723,675

DEVICE FOR CONTROLLING THE FUEL FLOW FROM THE FUEL TANKS OF AN AIRCRAFT

Charles Geoffrey Longford, Gloucester, England, assignor to Gloster Aircraft Company Limited, Hucclecote, England, a British company Application November 20, 1951, Serial No. 257,399

Claims priority, application Great Britain June 19, 1951

10 Claims. (Cl. 137—99)

This invention relates to devices for controlling the liquid flow from two or more supplies and is particularly concerned with the control of fuel flow from the fuel tanks of an aircraft.

In an aircraft with several fuel tanks situated in several different positions, it is desirable that the rate of fuel consumption from all tanks shall be in equal proportions at all times and under all flight conditions (such as climb and dive and rolling) in order to ensure that the position of the centre of gravity of the aircraft shall remain fixed.

An object of the invention is thus to provide apparatus for maintaining substantially constant the ratio of the flow rates from two or more liquid supplies.

In an automatic flow regulator according to the invention, each liquid supply has a throttle valve and a device sensitive to the rate of flow from the supply and means under the joint control of the rate of flow devices are arranged to control the throttle valves so that when the ratio of the flow rate from any supply to the flow rates from the other supply or supplies deviates from a prescribed value the throttle valves are operated to restore the ratio.

The throttle valves are preferably actuated by the liquid pressure itself, the pressure being controlled by the control means. In this way, the flow regulator is rendered independent of external power supplies.

The invention will be more readily understood by way of example from the following description of aircraft fuel regulators in accordance therewith, reference being made to the accompanying schematic drawings in which:

Figure 1 is a sectional view of a regulator for an aircraft having two fuel tanks, Figure 1A is a view of the control means of the regulator in a position causing throttles of the supply from one of the tanks.

Figure 2 is a view of the controlling means of Figure 1,

Figure 3 is a side view of a regulator for three fuel tanks,

Figure 4 is an underneath plan of the arrangement of the flow rate devices of Figure 3, Figure 5 is a section on the lines V—V of Figure 3, Figure 6 is a side view of a regulator for four fuel tanks, and Figure 7 shows the connections of the four flow rate devices of Figure 6.

Referring to Figures 1 and 2, the regulator 12 has two inlet ducts 13, 14 each connected to a separate fuel tank and an outlet duct 15 connected to the engine. Each inlet duct 13, 14 protrudes into a regulating chamber 16, 17; as the chambers 16, 17 and their contents are similar only chamber 16 will be described.

The inner end of inlet duct 13 acts as a valve seat for a throttle valve plate 18 which is carried loosely on a hollow stem 19 and is guided by four guide posts 20 secured to the wall of the regulator 12. One wall of chamber 16 is formed by the diaphragm 21 which has a central stiffened portion 22 and which has a larger area than the plate 18. The stem 19 is secured to and passes through the stiffened portion 22 into a diaphragm chamber 23 behind the diaphragm. A helical compression spring 11 abutting at one end against stiffened portion 22 urges the valve plate 18 outwardly against a shoulder on the stem 19 formed by the enlarged extremity 24 carrying a filter 25 and a restricted passage 26 of approximately 0.045" diameter leading into the hollow bore of the stem 19. The ends of the four posts 20 limit the possible forward movement of diaphragm 21.

The chamber 23 has an outlet tube 27 leading to an orifice 28 of about 0.07" diameter while the chamber 16 has a large outlet 29 which can be covered by a disc 30 biased towards the outlet 29 by spring 31, and carried on an arm 32 pivoted at 33. The spring 31 is so adjusted that the deflection of the disc 30 away from the outlet is approximately proportional to rate of fuel flow from the outlet 30.

As before noted, the arrangement of the regulating chamber 17 is exactly the same as that of chamber 16. Chamber 17 has an outlet tube 27A leading from the diaphragm chamber 23A and terminating in orifice 28A disposed adjacent orifice 28 and an arm 32A pivoted at 33A and carrying the disc 30A, the deflection of which is proportional approximately to rate of fuel flow from chamber 17.

The arms 32, 32A pass through slots in the wall of a box-like casing 34 and their extremities engage against the undersides of the arms of T-shaped lever 36. Lever 36 runs on loose fitting guides 37 permitting tilting of the lever and is biased downwardly by spring 38 attached to the casing 34. The stem of lever 36 passes between the arms 39 of a fork on the lower end of a controlling lever 40 pivoted at 41 to the casing 34. Lever 40 is fitted with a balance weight 42 and carries at its upper extremity a small plate 43 adapted to cover and close either of the orifices 28, 28A when tilted sufficiently about its pivot axis 41. Stops 44 limit the possible pivot movement of lever 40 while vibratory movement is largely prevented by the damping vane 45 secured to the lever 40. The gap between plate 43 and orifices 28, 28A is about 0.002".

The operation of the regulator is as follows:

The arms 32, 32A are shown as pivoted at their midpoints; the regulator will then operate to maintain the rates of flow through the two chambers 16, 17 substantially equal. If any other ratio between the rates of flow is desired, the location of the pivot points 33, 33A is suitably adjusted.

Considering for the moment chamber 16 only, the fuel enters through the inlet port 13 and round the throttle valve plate 18 and leaves by the outlet 29. A very small proportion of the fuel from the tank passes through the filter 25, restriction 26, the bore of stem 19 and into the diaphragm chamber 23; build-up of pressure in this space 23 is however prevented by the outlet tube 27 through which the fuel escapes, the controlling plate 43 being assumed to be in its central position in which it shuts off neither orifice 28, 28A.

As the fuel passes out of chamber 16 through outlet 29 it deflects disc 30 and arm 32 by an amount proportional to the rate of flow. Similarly, arm 32A is deflected by an amount proportional to the rate of flow from chamber 17. When the two rates of flow are equal, the arms 32, 32A will cause no tilting of the lever 36 and any equal changes in the rates of flow will merely result in a linear movement of lever 36 in the direction of its stem and owing to the method of connection between levers 36 and 40 no movement of lever 40; the controlling plate is thus maintained in its central position as shown.

If the rate of flow from outlet 29, for example, increases without a proportional increase of the rate of flow from the outlet from chamber 17, the deflection of arm 32 will be greater than that of arm 32A with a result that lever 36 is tilted in a clockwise sense. This causes lever 40 to be tilted in an anti-clockwise sense and orifice 28 to be at least partly closed by the controlling plate 43 as shown in Fig. 1A. The resulting build-up in pressure in the diaphragm chamber 23 assisted by the action of spring 46 forces the diaphragm 22 outwards so that throttle valve plate 18 is moved towards its valve seat to reduce the rate of flow of fuel into chamber 16 until it almost equals the rate of flow through chamber 17. The rate of flow will be maintained at this value with the controlling plate 43 covering a small part of the orifice 28.

If the fuel tank connected to inlet port 14, for example, should be damaged with the result that no fuel is supplied to chamber 17, nozzle 27 will be totally covered and there will be a tendency for throttle valve plate 18 to close off the inlet to chamber 16 and thus prevent the supply of any fuel to the engine. This would occur if there were a rigid connection between the diaphragm 22 and valve plate 18, but the spring 11, which normally transmits movements of the diaphragm to the valve plate, in these circumstances permits the plate 18 to move away from its valve seat under the pressure of the fuel and ensures that the engine is always supplied with fuel at the expense of the pressure drop created by spring 11 and plate 18.

Figures 3, 4 and 5 show a modification for three fuel tanks of the regulator of Figures 1 and 2. There is a regulating chamber 16 for each fuel tank each having an outlet tube 27 and a disc 30 at the main outlet. For the sake of simplicity the chamber 16 of only one tank is shown in Figure 3 but as shown in Figure 4 the three chambers are equally spaced round the stem of lever 36 which in this case has three equally shaped laterally extending arms 50. Each disc 30 at the outlet of the chambers is carried on a separate arm 32 pivoted at 33 as before and each arm 32 bears against the underside of a separate lever arm 50. The controlling lever 40 is mounted on a spherical pivot 51 and is coupled to lever 36 by a connecting member having an opening 52, through which the lever 36 passes. The controlling plate 43 on the upper end of lever 40 is in this case of substantially triangular shape and is disposed in relation to the three orifices 28 so that it can close any one or two of the orifices on suitable pivotal movement of lever 40.

The operation of the regulator of Figures 3, 4 and 5, will be obvious from the description of that of Figures 1 and 2; when all three rates of flow are equal or in any other desired ratio determined by the location of pivots 33, the plate 43 will take up the position relative to orifices 28 which is shown in Figure 5 and in which none of the orifices 28 is covered by the plate. If the rate of flow from one regulating chamber increase, for example, so that the ratio is altered, the controlling lever is pivoted to cause the orifice 28 associated with that chamber to be covered with the result that the flow rate through that chamber is reduced and the ratio restored almost to the desired value.

When there are four fuel tanks, the four regulating chambers are arranged in line as shown in Figure 7; in Figure 6, for the sake of simplicity, only one regulating chamber is shown. In this case there is a separate T-shaped lever 36, controlling lever 40 and controlling plate 43 for each regulating chamber, the controlling plate 43 controlling the discharge of fuel from the orifice 28 of the associated chamber 16. Each disc 30 at the outlets of the chambers 16 is carried as before on a separate arm 32 pivoted on pivots 33 and engages one arm of the associated T-shaped lever 36. The other arm of lever 36 is engaged by an arm 60 secured to a rotatable shaft 61, the angular position of which is in accordance with the mean value of the displacements of all four discs 30. For this purpose, the shaft 61 carries a short arm 62 pivoted to a link 63 which is pivotally secured at 64. A second link 65 lying at right angles to link 64 is pivoted to it at its mid-point. Link 65 is pivoted at its ends to short downwardly extending members 66 secured to the mid-points of short links 67, 68 each of which is pivoted at its ends to short downwardly extending members secured to arms 32 as shown. Link 63 will thus take up a pivotal position about pivot 64 in accordance with the mean deflections of the four arms 32.

The operation of the arrangement of Figures 6 and 7 is as follows: Assuming all four rates of flow are in the desired ratio, the mean value of the rates will be at a prescribed value and none of the levers 36 will be deflected and none of the orifices 28 will be covered by their respective controlling plates 43. Supposing, for example, the rate of flow through one of the chambers 16 increases from this condition; the deflection of the associated arm 32 will then increase. The mean value of the rates of flow also increases but not by a proportional amount; the result will be that the lever 36 will be tilted so that the throttle valve of the regulating chamber in question is closed and the ratio restored substantially to the required value.

It will be appreciated that the arrangement of Figures 5 and 6 can be readily modified for more than four fuel tanks as desired.

I claim:

1. An automatic flow regulator for a plurality of liquid supplies comprising a throttle valve for at least one of said supplies, a pressure-responsive means operatively connected to said valve for controlling the same and controlled by the pressure of liquid, a conduit for supplying said pressure-responsive means with liquid from the supply associated with the valve, a device for each supply sensitive to the rate of flow thereof, a mechanism common to said devices and controlled by the same in accordance with the deviation of the ratio of said rates of flow from a prescribed value, and means controlled by said mechanism for controlling the pressure of liquid in said pressure-responsive means in accordance with said deviation whereby the valve maintains said ratio substantially at said prescribed value.

2. An automatic flow regulator for at least two liquid supplies comprising, for each said supply, a throttle valve, a pressure responsive means operatively connected to said valve for controlling same and controlled by the pressure of liquid, a conduit for supplying said pressure-responsive means with liquid from the respective supply, and a device sensitive to the rate of flow through said valve; a mechanism common to said devices controlled by the same in accordance with the deviation of the ratio of said rates of flow from a prescribed value as sensed by said devices; and means controlled by said mechanism for differentially varying the pressure of liquid in said pressure responsive means in accordance with said deviation, whereby the valves maintain said ratio substantially at said prescribed value.

3. An automatic flow regulator for at least two liquid supplies comprising, for each said supply, a throttle valve, a pressure-responsive means operatively connected to said valve for operating the same, a conduit for supplying said pressure responsive means with liquid from the respective supply, a liquid outlet from said pressure-responsive means, the flow of liquid through said outlet controlling the valve and a device sensitive to the rate of flow through said valve; a mechanism common to said devices and controlled by the same in accordance with the deviation of the ratio of said rates of flow from a prescribed value as sensed by said devices; and obturating means controlled by said mechanism for selectively obturating said outlets to control the flow of liquid therethrough in accordance with said deviation, whereby the valves maintain said ratio substantially at said prescribed value.

4. An automatic flow regulator for a plurality of liquid supplies comprising, for each supply, a separate throttle valve comprising a valve seat and a regulable valve member for controlling the flow of liquid through the valve, a diaphragm on which said valve member is mounted and which forms one wall of a chamber, the position of the valve member being controlled by a deflection of the diaphragm, a conduit for supplying liquid from the respective supply to said chamber, a regulable liquid outlet from said chamber, and a flow-sensitive device sensitive to the rate of flow through said valve; a mechanism common to said devices and controlled by the same in accordance with the deviation of the ratio of said rates of flow from a prescribed value as sensed by said devices; and obturating means controlled by said mechanism for differentially obturating said outlets in accordance with said deviation thereby differentially controlling the pressures in said chambers, the pressure in each chamber controlling the deflection of the respective diaphragm for correspondingly setting the valve member of the respective valve whereby said ratio is maintained substantially at said prescribed value.

5. An automatic flow regulator for a plurality of liquid supplies comprising, for each supply, a throttle valve comprising a valve seat and a regulable valve member for controlling the flow of liquid through the valve, a diaphragm forming one wall of a chamber, a valve stem carried on said diaphragm and carrying said valve member to control the position of the valve member by a deflection of the diaphragm, said valve stem passing through said valve member and being hollow to provide a conduit for feeding liquid from the respective supply to said chamber, a regulable liquid outlet from said chamber, and a flow-sensitive device sensitive to the rate of flow through said valve; a mechanism common to said devices and controlled by the same in accordance with the deviation of the ratio of said rates of flow from a prescribed value as sensed by said devices; and obturating means controlled by said mechanism for differentially obturating said outlets in accordance with said deviation thereby differentially controlling the pressures in said chambers, the pressure in each chamber controlling the deflection of the respective diaphragm for correspondingly setting the valve member of the respective valve whereby said ratio is maintained substantially at said prescribed value.

6. An automatic flow regulator according to claim 5 in which said valve member is mounted movably on said valve stem and is biased towards said valve seat by spring means, the movement of the diaphragm being normally transmitted through said spring to said valve member.

7. An automatic flow regulator according to claim 5 in which each said flow sensitive means comprises a spring biased plate in the supply downstream of said valve and a pivoted arm bearing at one end on said plate whereby the motion of said arm is linearly dependent on the flow.

8. An automatic flow regulator for two liquid supplies comprising, for each supply, a separate supply duct, a throttle valve having a valve seat and a regulable valve member for controlling the flow of liquid through the valve in each duct, a diaphragm on which said valve member is mounted and which forms one wall of a chamber, the position of said valve member being controlled by a deflection of said diaphragm, a conduit for supplying liquid from upstream of said valve to said chamber, a regulable liquid outlet from said chamber, a plate located within each duct, a spring bias means for biasing each of said plates against the liquid flow, and pivoted arms each bearing at one end against each of said plates; a lever mounted for both pivotal and linear movement and coupled with both said arms, and a pivoted obturating member pivotally connected with said lever for obturating differentially said outlets from the chambers in accordance with the relative movement of both said plates thereby differentially controlling the pressures in said chambers, the pressure in each chamber controlling the deflection of the respective diaphragm for correspondingly setting the valve member of the respective valve whereby the rate of flow through said valves is maintained substantially at a prescribed value.

9. An automatic flow regulator for three liquid supplies comprising, for each supply, a regulable supply duct, a throttle valve having a valve seat and a regulable valve member in each duct, a diaphragm on which said valve member is mounted and which forms one wall of a chamber, the position of said valve member being controlled by a deflection of said diaphragm, a conduit for supplying liquid from upstream of said valve, to said chamber, a regulable liquid outlet from said chamber, a plate located within each duct, a spring bias means for biasing each of said plates against the liquid flow, and pivoted arms each bearing at one end against one of said plates; a lever mounted for both linear motion and universal pivoting, said lever having three equally spaced projections against which said three pivoted arms engage; and a universally pivoted obturating plate operatively connected to said lever for selectively obturating said three outlets in accordance with the relative movements of said three plates thereby differentially controlling the pressures in said chambers, the pressures in each chamber controlling the deflection of the respective diaphragm for correspondingly setting the valve member of the respective valve whereby the rates of flow through said valves is maintained substantially at a prescribed value.

10. An automatic flow regulator for regulating the flow of liquid from several sources of supply to a common consumer, said regulator comprising inlet ducts each communicating with one source of supply and an outlet duct communicating with the consumer, a throttle valve means included in each inlet duct, each of said valve means comprising a closed housing, a diaphragm for each housing dividing the same in a flow chamber and a control chamber, each flow chamber having an inlet opening communicating with the respective inlet duct and an outlet opening communicating with the outlet duct, a feed conduit to each control chamber for feeding liquid from the respective inlet duct to the chamber and an outlet conduit from each control chamber, a movable valve member in each flow chamber controlling the rate of flow through the respective inlet opening and operatively coupled with the respective diaphragm to control the position of the respective valve member by the deflection of the diaphragm, a device sensitive to the rate of flow disposed on the downstream side of the outlet opening of each housing, a mechanism common to all said devices and controlled by the same in accordance with a deviation of the ratio of said rates of flow, and obturating means controlled by said mechanism for correspondingly obturating said outlet conduits from the control chambers to vary differentially the pressures in said flow chambers and to deflect correspondingly the diaphragms whereby said ratio is maintained substantially at said prescribed value.

References Cited in the file of this patent
UNITED STATES PATENTS

| | | |
|---|---|---|
| 1,558,529 | Wunsch | Oct. 27, 1925 |
| 1,870,264 | Paulsen | Aug. 9, 1932 |
| 1,961,350 | Grunsky | June 5, 1934 |
| 2,145,114 | Gibbs et al. | Jan. 24, 1939 |
| 2,509,629 | Giers et al. | May 30, 1950 |
| 2,538,824 | Andresen, Jr. | Jan. 23, 1951 |
| 2,624,360 | Goddard | Jan. 6, 1953 |

FOREIGN PATENTS

| | | |
|---|---|---|
| 490,607 | Great Britain | Aug. 17, 1938 |